(12) United States Patent
Xu et al.

(10) Patent No.: US 9,450,663 B2
(45) Date of Patent: Sep. 20, 2016

(54) COMMUNICATION SYSTEMS AND METHODS

(71) Applicant: Apple Inc., Cupertino, CA (US)

(72) Inventors: Hua Xu, Nepean (CA); Jianglei Ma, Kanata (CA); Ming Jia, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/746,972

(22) Filed: Jun. 23, 2015

(65) Prior Publication Data

US 2015/0295632 A1 Oct. 15, 2015

Related U.S. Application Data (63) Continuation of application No. 13/556,363, filed on Jul. 24, 2012, now Pat. No. 9,094,188, which is a continuation of application No. 12/243,023, filed on Oct. 1, 2008, now Pat. No. 8,254,429.

(60) Provisional application No. 60/976,948, filed on Oct. 2, 2007.

(51) Int. Cl.
*H04B 7/02* (2006.01)
*H04B 7/06* (2006.01)
(Continued)

(52) U.S. Cl.
CPC ........... *H04B 7/0669* (2013.01); *H04L 1/0073* (2013.01); *H04L 1/0668* (2013.01);
(Continued)

(58) Field of Classification Search
CPC ......... H04L 1/06; H04L 1/0606; H04L 1/04; H04L 1/0612; H04L 1/0618; H04L 1/0625; H04L 1/0643; H04L 1/0668; H04L 1/1858; H04L 5/0003; H04L 5/0016; H04L 5/0019; H04L 5/0021; H04L 5/0023; H04L 5/0007; H04L 27/26; H04L 27/2601; H04B 7/068; H04B 7/0613; H04B 7/02; H04B 7/0697; H04B 7/06; H04B 7/12
USPC ........ 375/140, 146, 267, 259, 260, 295, 299
See application file for complete search history.

(56) References Cited

U.S. PATENT DOCUMENTS 6,185,258 B1 2/2001 Alamouti et al.
8,009,720 B2 8/2011 Lee et al.
(Continued)

FOREIGN PATENT DOCUMENTS

WO 2008000069 1/2008
WO 2008026898 3/2008

OTHER PUBLICATIONS

3GPP TS 36.211 V8.4.0 (Sep. 2008). Technical Specification 3rd Generation Partnership Project; Technical Specification Group Radio Access Network; Evolved Universal Terrestrial Radio Access (E-UTRA); Physical Channels and Modulation (Release 8); Cover Page and pp. 58-60.
(Continued)

*Primary Examiner* — Siu Lee
(74) *Attorney, Agent, or Firm* — Meyertons, Hood, Kivlin, Kowert & Goetzel, P.C.

(57) ABSTRACT

In accordance with embodiments, a communication system includes a first device and a second device in communication with the first device. The second device has at least a first pair and a second pair of antennas. The second device spreads a communication bit by a predetermined spreading factor and forms a first set of spatial block codes in frequency domain based on the spread communication bit. The first set of spatial block codes being consecutively transmitted on one of the first and second pairs of antennas.

26 Claims, 5 Drawing Sheets

(51) Int. Cl.
*H04L 1/00* (2006.01)
*H04L 1/06* (2006.01)
*H04L 1/16* (2006.01)
*H04L 1/18* (2006.01)
*H04W 52/42* (2009.01)
*H04L 5/00* (2006.01)
*H04W 72/12* (2009.01)

(52) U.S. Cl.
CPC ........... *H04L1/1607* (2013.01); *H04L 1/1861* (2013.01); *H04L 5/0055* (2013.01); *H04W 52/42* (2013.01); *H04W 72/1263* (2013.01); *H04W 72/1278* (2013.01)

(56) References Cited

U.S. PATENT DOCUMENTS

| | | |
|---|---|---|
| 8,140,929 B2 | 3/2012 | Kim et al. |
| 8,254,241 B2 | 8/2012 | Branlund et al. |
| 2006/0262007 A1 | 11/2006 | Bonthron et al. |
| 2007/0121751 A1 | 5/2007 | Li et al. |
| 2008/0181170 A1 | 7/2008 | Branlund et al. |
| 2008/0304593 A1 | 12/2008 | Khan et al. |
| 2008/0310483 A1* | 12/2008 | Lee ............... H04B 7/0678 375/146 |
| 2009/0059884 A1* | 3/2009 | Zhang ............ H04L 1/0606 370/342 |

OTHER PUBLICATIONS

Hua Xu et al; "4-TX Transmit Diversity Design for PHICH Channel in LTE Downlink"; U.S. Appl. No. 60/976,948; Oct. 2, 2007.

Jianzhong Zhang et al; Transmission Methods for Downlink ACK/NACK Channels; U.S. Appl. No. 60/935,300; Aug. 3, 2007; 14 pages.

\* cited by examiner

COMMUNICATION SYSTEMS AND METHODS

CROSS-REFERENCE TO RELATED APPLICATIONS

This application is a continuation of U.S. patent application Ser. No. 13/556,363, filed on Jul. 24, 2012, entitled "Communication Systems and Methods for Transmitting Over PHICH Channels", invented by Hua Xu, Jianglei Ma and Ming Jia, which is a continuation of U.S. patent application Ser. No. 12/243,023, filed on Oct. 1, 2008, now U.S. Pat. No. 8,254,429, which claims the benefit of priority to the U.S. Provisional Application Ser. No. 60/976,948, by Hua Xu et al., entitled "4-TX TRANSMIT DIVERSITY DESIGN FOR PHICH CHANNEL IN LTE DOWNLINK", filed on Oct. 2, 2007. All of the above identified Applications are hereby incorporated by reference in their entireties as though fully and completely set forth herein.

BACKGROUND

For open-loop fading channel, diversity is often considered the only choice to mitigate the fading effects and improve the system reliability. While forward error correction (FEC) coding provides valuable time diversity, for a slow fading environment, space diversity/polarization proves to be more effective. The objective of the so-called space-time codes is to maximize the diversity.

There are basically two kinds of space-time codes: trellis codes and block codes. While trellis codes provide additional coding gain, they have drawbacks, namely: the decoder is more complex (since these codes work on the QAM symbols), and it is difficult to concatenate trellis space-time codes with powerful soft-decoding FEC codes, such as Turbo codes and convolutional codes. Space-time block codes (STBCs) do not provide coding gain, but they are simple to decode (especially for complex orthogonal design codes), and they can be combined with other soft-decoding FEC codes. It is for these reasons that STBCs are more practical and are widely adopted by numerous standards.

The best known STBC was invented by Alamouti and Tarokh (U.S. Pat. No. 6,185,258) where the code matrix is presented as in Table 1 below.

TABLE 1

|  | Time t | Time (t + T) |
|---|---|---|
| Antenna 1 | $S_1$ | $S_2$ |
| Antenna 2 | $-S_2^*$ | $S_1^*$ |

The Alamouti code has several properties, which facilitate space diversity implementations. The signals are orthogonal; hence full diversity is achieved at the receiver side. The transmit power is balanced between the two antennas and the two time slots; hence a low cost power amplifier can be used (reducing the modem cost). Further, the code rate is 1; hence no throughput is sacrificed. Further, its maximum likelihood decoder is very simple, which makes the cost of an optimal decoder negligible.

Unfortunately, it was proven later that there are no such orthogonal codes existing for a system with more than two transmitter antennas. Therefore, the focus was shifted to the following two approaches: designing orthogonal STBC codes with a code rate smaller than 1; and designing quasi-orthogonal STBC codes to maintain the property of code rate 1. While the first approach sacrifices the system throughput, the second approach sacrifices signal quality due to a loss of orthogonality. There are several variations of codes that follow the two approaches described above, with focus on other areas such as power balancing and code rate manipulation. However, the Alamouti is still preferred for many implementations.

Table 2 is an example of an STBC for 4 antenna applications (Code-A). Code-A is an orthogonal code having code rate 3/4. Maintaining orthogonality as in Code-A helps maintain diversity order and signal quality.

TABLE 2

|  | Time t | Time (t + T) | Time (t + 2T) | Time (t + 3T) |
|---|---|---|---|---|
| Antenna 1 | $S_1$ | $-S_2^*$ | $-S_3^*$ | x |
| Antenna 2 | $S_2$ | $S_1^*$ | x | $S_3^*$ |
| Antenna 3 | $S_3$ | x | $S_1^*$ | $-S_2^*$ |
| Antenna 4 | x | $-S_3$ | $S_2$ | $S_1$ |

With Code-A, each received signal has a diversity order of 4. However, one weakness of Code-A is its code rate loss, which must be compensated in FEC codes. In other words, due to the rate loss in STBC, the code rate in FEC must be higher. Higher code rates can cause problems for the powerful trellis codes, whose coding gain loss becomes significant when punctuation becomes excessive. Further, Code-A does not achieve full power balance across the transmit antennas.

Table 3 contains a second example of STBC for 4 antenna applications (Code-B). Code-B is a non-orthogonal code having code rate 1. Maintaining the throughput as in Code-B helps prevent loss of coding gain at the FEC stage.

TABLE 3

|  | Time t | Time (t + T) | Time (t + 2T) | Time (t + 3T) |
|---|---|---|---|---|
| Antenna 1 | $S_1$ | $-S_2^*$ | $S_3$ | $-S_4^*$ |
| Antenna 2 | $S_2$ | $S_1^*$ | $S_4$ | $S_3^*$ |
| Antenna 3 | $S_3$ | $-S_4^*$ | $S_1$ | $-S_2^*$ |
| Antenna 4 | $S_4$ | $S_3$ | $S_2$ | $S_1^*$ |

Since Code-B is not an orthogonal code, its determinant suffers from mutual interference. Defining the equivalent channel matrix Q as $$Q = \begin{bmatrix} h_1 & h_2 & h_3 & h_4 \\ h_2^* & -h_1^* & h_4^* & -h_3^* \\ h_3 & h_4 & h_1 & h_2 \\ h_4^* & -h_3^* & h_2^* & -h_1^* \end{bmatrix}, \text{ then}$$

$\vec{r} = Q\vec{s}$, where $\vec{r} = [r_1 \; r_2^* \; r_3 \; r_4^*]^T$, and $\vec{s} = [s_1 \; s_2 \; s_3 \; s_4]^T$.

The determinant of Q is given by $$|Q| = A^2 - B^2,$$

where $$A = |h_1|^2 + |h_2|^2 + |h_3|^2 + |h_4|^2, \text{ and}$$

$$B = 2(Re(h_1 h_3^*) + Re(h_2 h_4)).$$

The element of $B^2$ represents the loss due to the loss of orthogonality. Since $B^2 \leq 0$, it always contributes negatively to the code performance.

An example application of STBC is the Long Term Evolution (LTE) protocol, which defines a physical hybrid automatic repeat request (ARQ) indicator channel (PHICH) to transmit ACK/NACK bits. In general, the LTE protocol requires ACK/NACK bits to be spread and multiplexed together using code-division multiplexing (CDM), and to be repeated three times. The spreading factor (SF) selection for PHICH is non-trivial and has various consequences related to the spreading gain, ease of implementation, power balancing and other issues.

SUMMARY

In accordance with embodiments, a communication system comprises a first device and a second device in communication with the first device. The second device has at least a first pair and a second pair of antennas. The second device spreads a communication bit by a predetermined spreading factor and forms a first set of spatial block codes in frequency domain based on the spread communication bit. The first set of spatial block codes being consecutively transmitted on one of the first and second pairs of antennas.

In accordance with embodiments, a communication device comprises a transmitter with a control module. The communication device also comprises a first pair and second pair of antennas coupled to the transmitter. The control module causes a first set of spatial block codes, formed in frequency domain and corresponding to a spread communication bit, to be mapped for consecutive transmission on one of the first and second pairs of antennas.

In accordance with embodiments, a method comprises spreading a communication bit based on a predetermined spreading factor. The method further comprises forming a set of spatial block codes in frequency domain based on the spread communication bit and transmitting the set of spatial block codes consecutively over a pair of antennas.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a communication technique. In at least some embodiments, communication bits are spread and a set (two or more) of spatial block codes is formed in frequency domain for each spread communication bit. Each set of spatial block codes is transmitted consecutively over a pair of antennas. For example, in accordance with embodiments, a first set of spatial block codes is transmitted consecutively over a first pair of antennas, a second set of spatial block codes is transmitted consecutively over a second pair of antennas, and a third set of spatial block codes is transmitted consecutively over the first pair of antennas and so forth. The spatial block codes may be spatial frequency block codes (SFBC) and/or spatial time block codes (STBC). In some embodiments, the communication technique disclosed herein may be understood to be a modified SFBC+FSTD (frequency shift transmit diversity) scheme.

In accordance with some embodiments, devices that employ the communication technique have at least four transmit antennas (two pairs) and use a spreading factor of four. In such embodiments, the communication technique maintains orthogonality of communication bits while exploiting spatial transmit diversity with the four transmit antennas. Such embodiments also benefit from the spreading gain and facilitate the ability to use the simple and robust Alamouti decoder for decoding spatial block codes. Power imbalances on each transmit antenna can be mitigated by appropriately mapping spatial block codes to the different antennas.

The communication technique disclosed herein was designed for transmitting repeated ACK/NACK bits over PHICH channels in accordance with the LTE protocol. Accordingly, the disclosure discusses this application of the communication technique. However, embodiments are not limited to any particular application.

Figure 1:
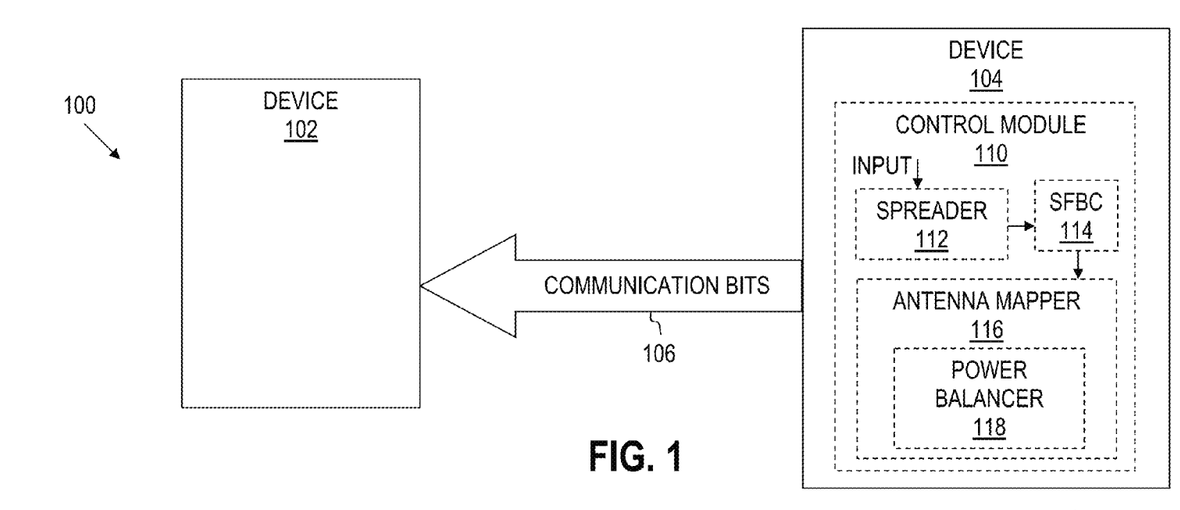
FIG. 1 illustrates a communication system in accordance with embodiments of the disclosure.

FIG. 1 illustrates a communication system 100 in accordance with embodiments of the disclosure. As shown, the communication system 100 comprises devices 102 and 104 in communication with each other. As an example, the device 102 may correspond to user equipment (UE) and the device 104 may correspond to a base station.

The device 104 comprises a control module 110 that controls the preparation and transmission of at least some communications bits 106. In accordance with at least some embodiments, the control module 110 comprises a spreader 112 that receives communication bits as input and spreads the communication bits based on a predetermined spreading factor. For ACK/NACK bits, the spreading factor is preferably equal to four. The control module 110 also comprises a SFBC block 114 that receives the spread communication bits from the spreader 112 and that forms a set of SFBCs for each spread communication bit. Each set of SFBCs includes as least two SFBCs. The control module 110 also comprises an antenna mapper 116 that maps each set of SFBCs to a pair of antennas for transmission to the device 102. In accordance with embodiments, the antenna mapper 116 selectively maps each set of SFBCs for consecutive transmission on different pairs of antennas.

As shown, the antenna mapper 116 comprises a power balancer 118, which mitigates power imbalances on different antennas by mapping different sets of SFBCs for consecutive transmission on different pairs of antennas as evenly as possible. Examples of such mappings will be described in greater detail for FIGS. 3A-3B and 4A-4B.

Figure 2:
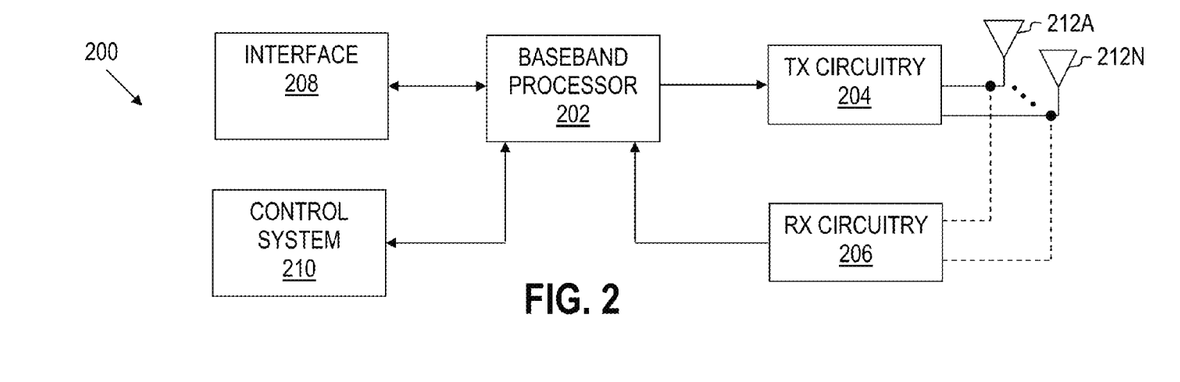
FIG. 2 illustrates a communication device in accordance with embodiments of the disclosure.

FIG. 2 illustrates a communication device 200 in accordance with embodiments of the disclosure. The communication device 200 provides a high level overview of various components involved in communications. As shown, the communication device 200 comprises a baseband processor 202 coupled to transmit (TX) circuitry 204 and receive (RX) circuitry 206. The TX circuitry 204 and RX circuitry 206 couple to a plurality of antennas 212A-212N (e.g., at least four antennas). The baseband processor 202 also couples to a control system 210 and an interface 208.

As an example, the communication device 200 may correspond to a base station or a user equipment device. In general, the RX circuitry 206 receives radio frequency signals bearing information from a remote transmitter. The RX circuitry 206 may include a low-noise amplifier and a filter, which operate to amplify received signals and remove broadband interference from received signals. The RX circuitry 206 also performs downconversion and digitization operations on received signals.

The baseband processor 202 processes digitized received signals to extract information or data bits conveyed in the received signal. This processing typically involves demodulation, decoding, and error correction operations. Accordingly, the baseband processor 202 is generally implemented in one or more digital signal processors (DSPs) and/or application-specific integrated circuits (ASICs). The received information can be utilized by the device 200 itself and/or transmitted to another device.

For transmissions, the baseband processor 22 receives digitized data (e.g., voice, data, or control information) from the interface 208 as directed by the control system 210 and encodes the data for transmission. The encoded data is output to the TX circuitry 204, which modulates the encoded data by a carrier signal having one or more desired transmit frequencies. In at least some embodiments, the TX circuitry 204 uses orthogonal frequency-division multiplexing (OFDM) modulation, which divides the transmission band into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used. The TX circuitry 204 may also amplify the modulated carrier signal to an appropriate level for transmission and deliver the modulated carrier signal to the appropriate antennas 212A-212N.

In accordance with embodiments, the communication device 200 employs the control module 110 of FIG. 1 and/or its components. For example, the components/operations of the control module 110 may be incorporated into the control system 210 or may be distributed among other components of the communication device 200.

Figure 3A:
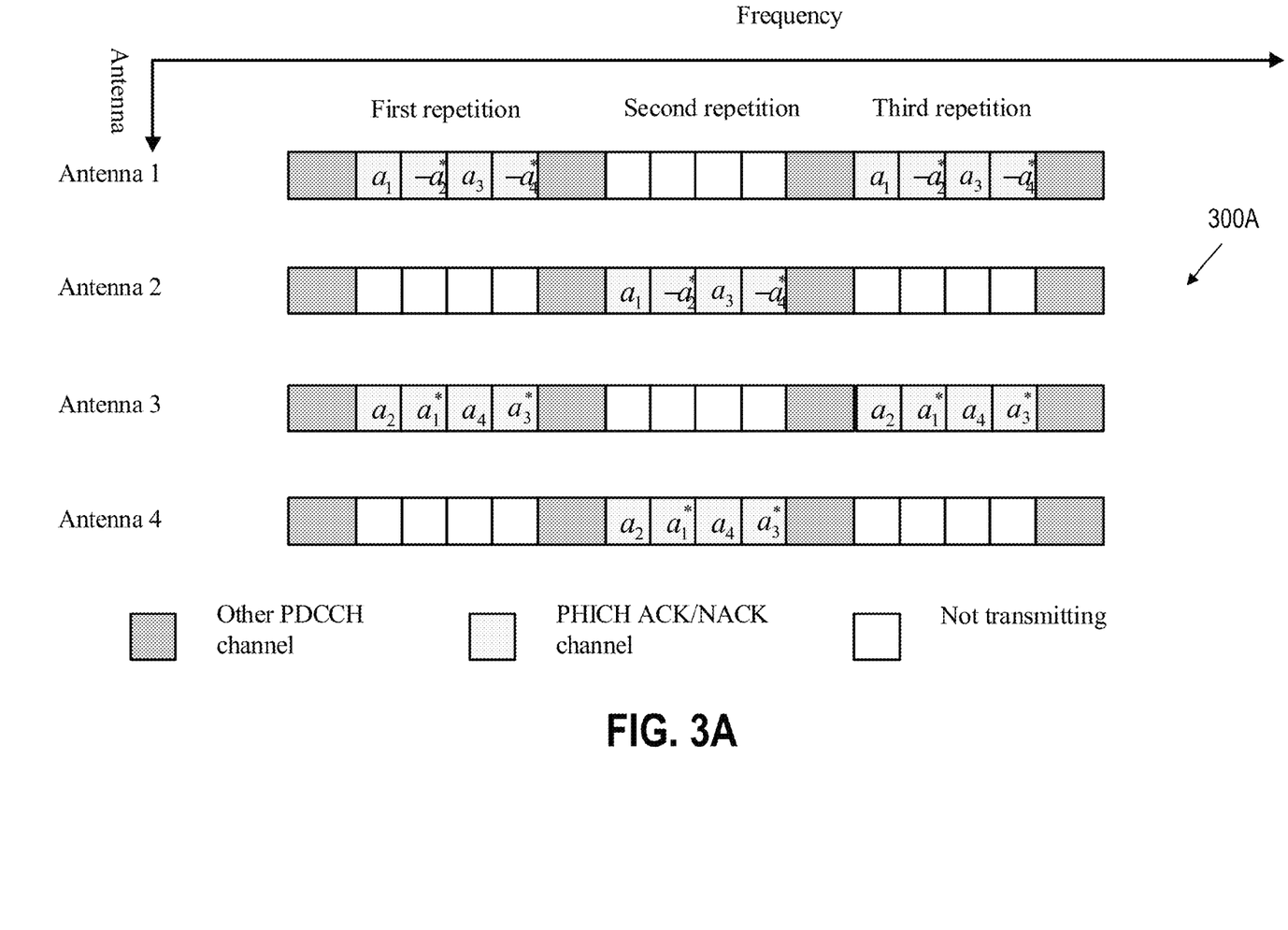
FIGS. 3A-3B illustrate ACK/NACK mappings in accordance with embodiments of the disclosure.

As previously mentioned, the communication technique disclosed herein is suitable for transmitting ACK/NACK repetitions over PHICHs according to the LTE protocol. FIG. 3A illustrates an ACK/NACK mapping 300A in accordance with embodiments of the disclosure. In the mapping 300A, three repetitions of ACK/NACK bits are mapped between antennas 1-4. More specifically, each ACK/NACK repetition is spread based on a spreading factor equal to four and is represented by two SFBCs. A first set of SFBCs, corresponding to the first ACK/NACK repetition, is transmitted consecutively on antennas 1 and 3. A second set of SFBCs, corresponding to the second ACK/NACK repetition, is transmitted consecutively on antennas 2 and 4. A third set of SFBCs, corresponding to the third ACK/NACK repetition, is transmitted consecutively on antennas 1 and 3.

Figure 3B:
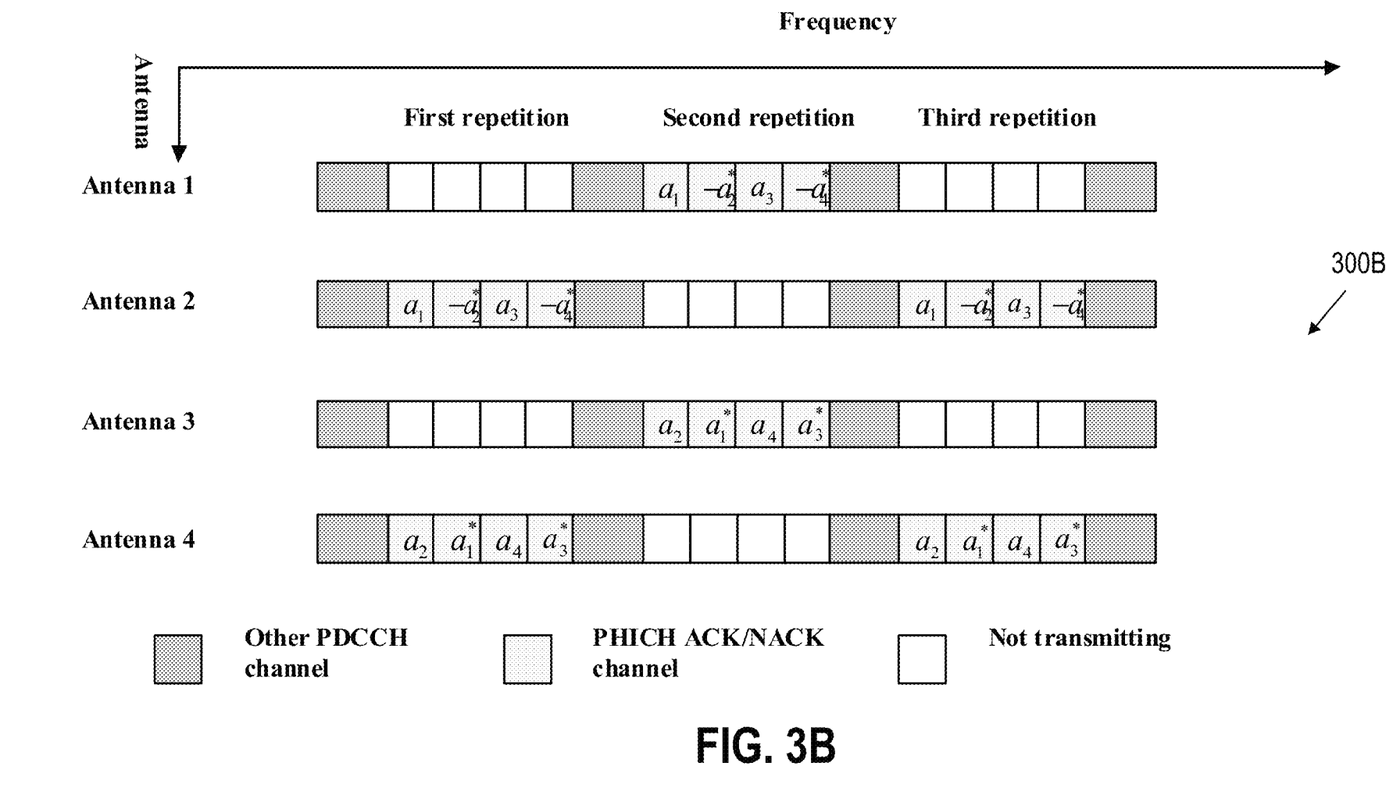

FIG. 3B illustrates another ACK/NACK mapping 300B in accordance with embodiments of the disclosure. In the mapping 300B, three repetitions of ACK/NACK bits are mapped between antennas 1-4. Each ACK/NACK repetition has been spread based on a spreading factor equal to four and is represented by two SFBCs. A first set of SFBCs, corresponding to the first ACK/NACK repetition, is transmitted consecutively on antennas 2 and 4. A second set of SFBCs, corresponding to the second ACK/NACK repetition, is transmitted consecutively on antennas 1 and 3. A third set of SFBCs, corresponding to the third ACK/NACK repetition, is transmitted consecutively on antennas 2 and 4.

To support the mappings 300A and 300B, four orthogonal vectors $$w_i \in C^{4 \times 1}, i=1,2,3,4$$

are generated and the vector $$a = b_1 w_1 + b_2 w_2 + b_3 w_3 + b_4 w_4$$

is formed to send four ACK/NACK bits $b_i$, i=1, 2, 3, 4. For the mappings 300A and 300B, four resource elements (REs) are needed to transmit one repetition for the four ACK/NACK bits (i.e., a total of 12 REs are needed to transmit three repetitions as in the mappings 300A and 300B). Advantageously, the structure of space-time code keeps the orthogonality during the transmission and, therefore, the four ACK/NACK bits can be decoded without introducing any cross-interference.

In the mappings 300A and 300B, power is not balanced across each of antennas 1-4. Specifically, more power is transmitted across antennas 1 and 3 for the mapping 300A (compared to antennas 2 and 4) because antennas 1 and 3 transmit two ACK/NACK repetitions while antennas 2 and 4 transmit one ACK/NACK repetition. Likewise, more power is transmitted across antennas 2 and 4 for the mapping 300B (compared to antennas 1 and 3) because antennas 2 and 4 transmit two ACK/NACK repetitions while antennas 1 and 3 transmit one ACK/NACK repetition.

To mitigate power imbalances, the mappings 300A and 300B can be used together. Preferably, the mappings 300A and 300B can be implemented evenly across a plurality of PHICHs. For example, in some embodiments, odd numbered PHICHs implement mapping 300A and even numbered PHICHs implement mapping 300B. Alternatively, odd numbered PHICH groups implement mapping 300A and even numbered PHICH groups implement mapping 300B, where each PHICH group refers to a number of PHICHs multiplexed on the same RE by orthogonal coding. Additionally, if there are multiple PHICHs or PHICH groups in each OFDM symbol, the mappings 300A and 300B can be applied in an alternating manner across OFDM symbols to balance power. The ACK/NACK mappings 300A and 300B of FIGS. 3A-3B are exemplary only and are not intended to limit embodiments of the invention to a particular mapping or application of the communication technique.

Figure 4A:
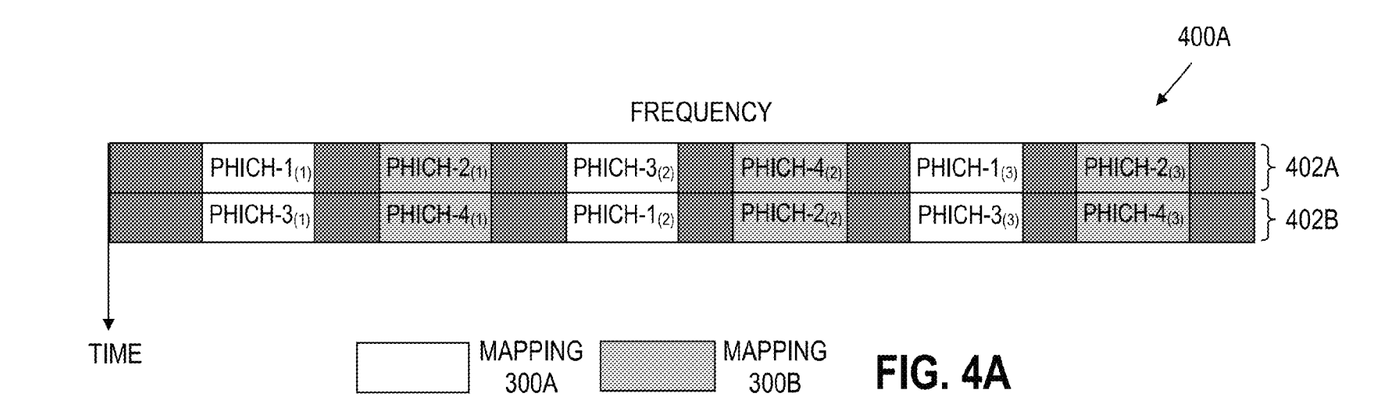
FIGS. 4A-4B illustrate PHICH mappings that apply the ACK/NACK mappings of FIGS. 3A and 3B across OFDM symbols to balance power in accordance with embodiments of the disclosure.
Figure 4B:
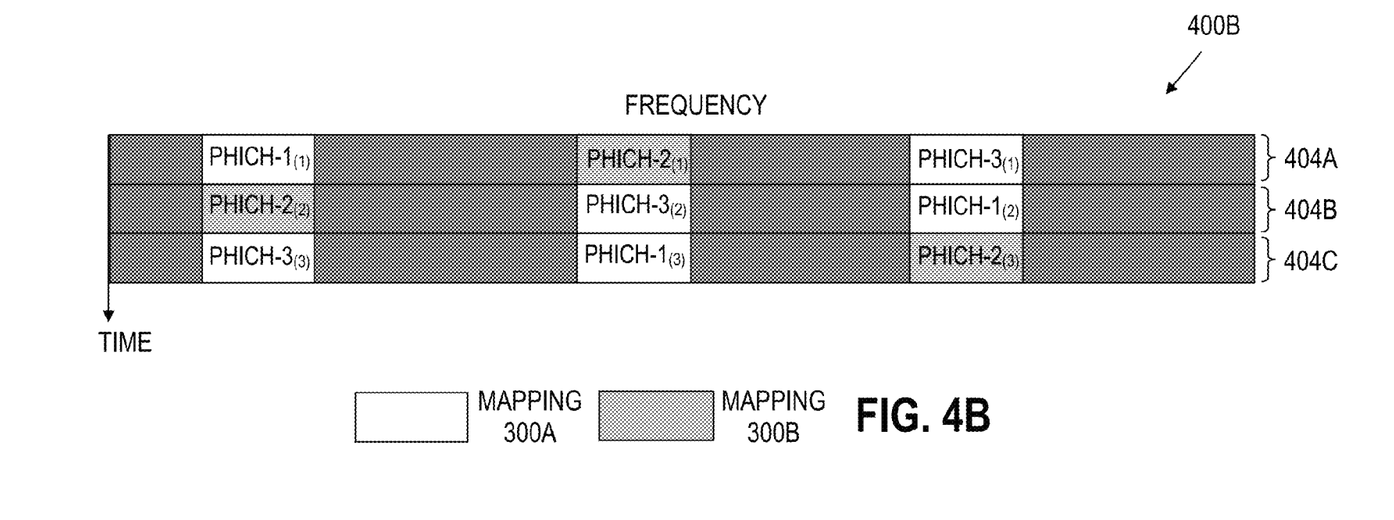

FIGS. 4A-4B illustrate PHICH mappings 400A and 400B that apply the ACK/NACK mappings 300A and 300B of FIGS. 3A and 3B across OFDM symbols to balance power. In the PHICH mapping 400A of FIG. 4A, there are two OFDM symbols 402A and 402B, each containing repetitions of a number of PHICHs. More specifically, OFDM symbol 402A contains a first repetition of PHICH-1 and PHICH-2 (labeled as PHICH-1$_{(1)}$ and PHICH-2$_{(1)}$ respectively), a second repetition of PHICH-3 and PHICH-4 (labeled as PHICH-3$_{(2)}$ and PHICH-4$_{(2)}$ respectively), and a third repetition of PHICH-1 and PHICH-2 (labeled as PHICH-1$_{(3)}$ and PHICH-2$_{(3)}$ respectively). The OFDM symbol 402B contains a first repetition of PHICH-3 and PHICH-4 (labeled as PHICH-3$_{(1)}$ and PHICH-4$_{(1)}$ respectively), a second repetition of PHICH-1 and PHICH-2 (labeled as PHICH-1$_{(2)}$ and PHICH-2$_{(2)}$ respectively), and a third repetition of PHICH-3 and PHICH-4 (labeled as PHICH-3$_{(3)}$ and PHICH-4$_{(3)}$ respectively). To balance power across the antennas being used, the PHICH mapping 400A applies the mappings 300A and 300B to different PHICHs in an alternating manner as shown.

In the PHICH mapping 400B of FIG. 4B, there are three OFDM symbols 404A, 404B, and 404C, each containing one repetition of a number of PHICHs. More specifically, the OFDM symbol 404A contains a first repetition of PHICH-1, PHICH-2 and PHICH-3 (labeled as PHICH-1$_{(1)}$, PHICH-2$_{(1)}$, and PHICH-3$_{(1)}$ respectively). The OFDM symbol 404B contains a second repetition of PHICH-1, PHICH-2 and PHICH-3 (labeled as PHICH-2$_{(2)}$, PHICH-3$_{(2)}$, and PHICH-1$_{(2)}$ respectively). The OFDM symbol 404C contains a third repetition of PHICH-1, PHICH-2 and PHICH-3 (labeled as PHICH-3$_{(3)}$, PHICH-1$_{(3)}$, and PHICH-2$_{(3)}$ respectively). To balance power across the antennas being used, the PHICH mapping 400B applies the mappings 300A and 300B to different PHICHs in an alternating manner as shown. The PHICH mappings 400A and 400B of FIGS. 4A-4B are exemplary only and are not intended to limit embodiments of the communication technique to a particular mapping or application. For example, if each OFDM symbol corresponds to a single PHICH, the mappings 300A and 300B can similarly be alternated over corresponding OFDMs to mitigate power imbalances.

In at least some embodiments, the communication technique involves various operations in accordance with the 3GPP protocol. In such embodiments, the control module 110 described previously performs such operations. For example, a block of symbols d(0), . . . , d($M_{symb}$−1) to be transmitted should be first aligned with resource element group size, resulting in a block of symbols $$d^{(0)}(0), \ldots, d^{(0)}(c \cdot M_{symb} - 1),$$

where c=1 for normal cyclic prefix; and c=2 for extended cyclic prefix. For normal cyclic prefix, $$d^{(0)}(i) = d(i),$$

for i=0, . . . , $M_{symb}$−1. For extended cyclic prefix, $$[d^{(0)}(4i) \quad d^{(0)}(4i+1) \quad d^{(0)}(4i+2) \quad d^{(0)}(4i+3)]^T =$$

$$\begin{cases} [d(2i) \quad d(2i+1) \quad 0 \quad 0]^T & n_{PHICH}^{group} \bmod 2 = 0 \\ [0 \quad 0 \quad d(2i) \quad d(2i+1)]^T & n_{PHICH}^{group} \bmod 2 = 1 \end{cases},$$

for i=0, . . . , ($M_{symb}$/2)−1.

The block of symbols $d^{(0)}(0)$, . . . , $d^{(0)}(c \cdot M_{symb}-1)$ are mapped to layers and precoded, resulting in a block of vectors $$y(i) = [y^{(0)}(i) \ldots y^{(P-1)}(i)]^T,$$

i=0, . . . , $c \cdot M_{symb}$−1, where $y^{(p)}(i)$ represents the signal for antenna port p, p=0, . . . , P−1, and the number of antenna ports for cell-specific reference signals P∈{1, 2, 4}. The layer mapping and precoding operation depends on the cyclic prefix length and the number of antenna ports used for transmission of the PHICH. The PHICH is transmitted on the same set of antenna ports as the physical broadcast channel (PBCH).

For transmission on four antenna ports (P=4), layer mapping follows Table 4 below. In Table 4, the number of layers is equal to the number of antenna ports.

TABLE 4

| Number of layers | Number of code words | Codeword-to-layer mapping i = 0, 1, . . . , $M_{symb}^{layer}$ − 1 |
|---|---|---|
| 4 | 1 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$  $M_{symb}^{layer} = M_{symb}^{(0)}/4$ |
|   |   | $x^{(3)}(i) = d^{(0)}(4i + 3)$ | with $M_{symb}^{(0)} = c \cdot M_{symb}$ and precoding by $$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix} \quad \text{Eq. 1}$$

if (i+$n_{PHICH}^{group}$) mod 2=0 for normal cyclic prefix, or (i+⌊$n_{PHICH}^{group}$/2⌋)mod 2=0 for extended cyclic prefix, where $n_{PHICH}^{group}$ is the PHICH group number and i=0, 1, 2, and by $$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix} \quad \text{Eq. 2}$$

otherwise for i=0, 1, 2. The value i is the repetition index of each bit (e.g., 3 repetitions) and $n_{PHICH}^{group}$ is the PHICH number (or PHICH group number) as in FIGS. 4A and 4B. Equation 1 corresponds to mapping a first repetition to a pair of antennas (e.g., antennas 1 and 3 as in FIG. 3A). Equation 2 corresponds to mapping a second repetition to a pair of antennas (e.g., antennas 2 and 4 as in FIG. 3A). Thus, in accordance with some embodiments, the mappings provided by Equations 1 and 2 are applied alternatively to different pairs of antennas to achieve the communication technique.

Figure 5:
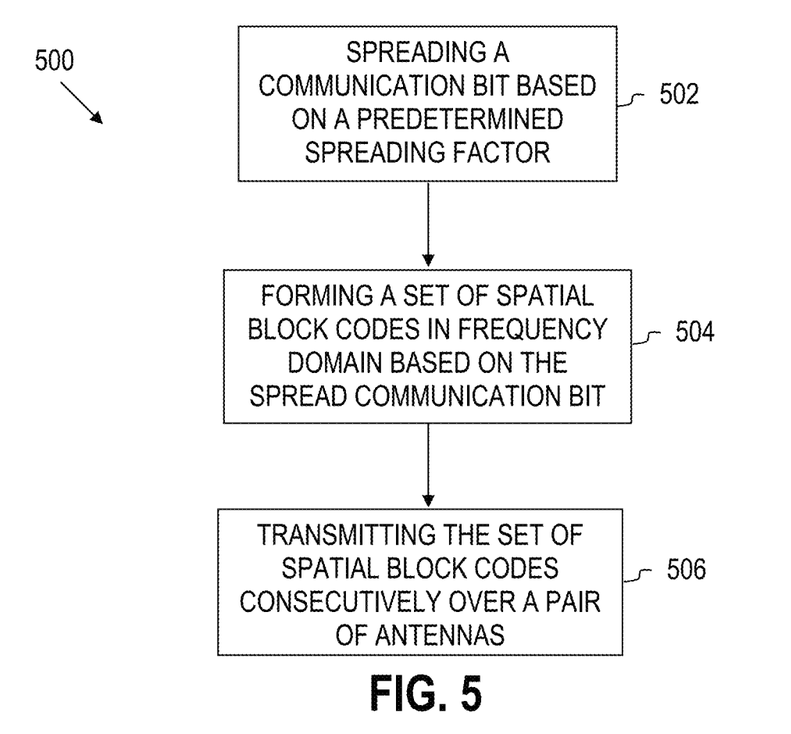
FIG. 5 illustrates a method in accordance with embodiments of the disclosure.

FIG. 5 illustrates a method 500 in accordance with embodiments of the disclosure. As shown, the method 500 comprises spreading a communication bit based on a predetermined spreading factor (block 502). In at least some embodiments, the spreading factor is equal to four. At block 504, the method 500 comprises forming a set of SFBCs based on the spread communication bit. At block 506, the set of SFBCs are consecutively transmitted over a pair of antennas.

In at least some embodiments, the method 500 comprises additional steps. For example, the method 500 may include forming an additional set of SFBCs corresponding to a repetition of the spread communication bit and transmitting the additional set of SFBCs consecutively over a different pair of antennas. Additionally or alternatively, the method 500 may include mapping separate sets of SFBCs corresponding to repetitions of the spread communication bit and transmitting each set of SFBCs consecutively over different pairs of antennas in an alternating manner. Additionally or alternatively, the method 500 may include selectively mapping three sets of SFBCs corresponding to three repetitions of ACK/NACK bits, transmitting the first and third sets of SFBCs on a first pair of antennas, and transmitting the second set of SFBCs on a second pair of antennas. Additionally or alternatively, the method 500 comprises selectively applying different ACK/NACK mappings to a PHICH mapping to balance power for a plurality of antennas.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communication device comprising:
    a first pair of antennas and a second pair of antennas;
    a transmitter coupled to the first pair and second pair of antennas, and comprising a control module, wherein the control module is configured to:
    map a first vector of modulation symbols onto a first group of exactly three sets of space-frequency block codes according to a first spatial alternation assignment, wherein each set of space-frequency block codes of the first group includes two or more space-frequency block codes arranged in frequency, wherein the first vector of modulation symbols corresponds to a first control channel, wherein said mapping the first vector according to the first spatial alternation assignment includes mapping a first and last of the exactly three sets of the first group to the first pair of antennas, and a middle one of the exactly three sets of the first group to the second pair of antennas;
    map a second vector of modulation symbols onto a second group of exactly three sets of space-frequency block codes according to a second spatial alternation assignment, wherein each set of space-frequency block codes of the second group includes two or more space-frequency block codes arranged in frequency, wherein the second vector of modulation symbols corresponds to a second control channel, wherein said mapping the second vector according to the second spatial alternation assignment includes mapping a first and last of the exactly three sets of the second group to the second pair of antennas, and a middle one of the exactly three sets of the second group to the first pair of antennas; and
    transmit the first group and the second group over a set of one or more OFDM symbols.

2. The communication device of claim 1, wherein the first control channel and the second control channel contain ACK/NACK information for one or more user equipment devices.

3. The communication device of claim 1, wherein each space-frequency block code of each set of the first group is an Alamouti code.

4. The communication device of claim 1, wherein the communication device is a base station.

5. The communication device of claim 1, wherein the control module is further configured to map each of a sequence of Physical Hybrid Automatic Repeat Request Indicator Channels (PHICHs) to a corresponding group of exactly three sets of space-frequency block codes, wherein even PHICHs of the sequence are mapped using the first spatial alternation assignment, wherein odd PHICHs of the sequence are mapped using the second spatial alternation assignment, wherein the sequence of PHICHs includes more than two PHICHs.

6. The communication device of claim 5,
wherein a transmission bandwidth of the one or more OFDM symbols includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences,
wherein, for each of the PHICHs, the first and last sets of space-frequency block codes of the corresponding group map onto a different OFDM symbol than the middle set.

7. The communication device of claim 5,
wherein the set of one or more OFDM symbols comprises at least three OFDM symbols,
wherein each of the PHICHs maps onto a set of three frequency resources,
wherein, for each of the PHICHs, the first, middle and last sets of space-frequency block codes of the corresponding group map onto distinct OFDM symbols.

8. The communication device of claim 5,
wherein the set of one or more OFDM symbols consists of only a first OFDM symbol,
wherein a transmission bandwidth of the first OFDM symbol includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences and are interleaved in frequency in an alternating manner,
wherein each of the odd PHICHs is mapped to a corresponding set of three frequency resources from the first subsequence, wherein, for each of the odd PHICHs, each one of the exactly three sets of space-frequency block codes of the corresponding group is mapped to a different one of the frequency resources of the corresponding set of three frequency resources;
wherein each of the even PHICHs is mapped to a corresponding set of three frequency resources from the second subsequence, wherein, for each of the even PHICHs, each one of the exactly three sets of space-frequency block codes of the corresponding group is mapped to a different one of the frequency resources of the corresponding set of three frequency resources.

9. A method for operating a communication device, the method comprising:
mapping a first vector of modulation symbols onto a first group of exactly three sets of space-frequency block codes according to a first spatial alternation assignment, wherein each set of space-frequency block codes of the first group includes two or more space-frequency block codes arranged in frequency, wherein the first vector of modulation symbols corresponds to a first control channel, wherein said mapping the first vector according to the first spatial alternation assignment includes mapping a first and last of the exactly three sets of the first group to a first pair of antennas, and a middle one of the exactly three sets of the first group to a second pair of antennas;
mapping a second vector of modulation symbols onto a second group of exactly three sets of space-frequency block codes according to a second spatial alternation assignment, wherein each set of space-frequency block codes of the second group includes two or more space-frequency block codes arranged in frequency, wherein the second vector of modulation symbols corresponds to a second control channel, wherein said mapping the second vector according to the second spatial alternation assignment includes mapping a first and last of the exactly three sets of the second group to the second pair of antennas, and a middle one of the exactly three sets of the second group to the first pair of antennas; and
transmitting the first group and the second group over a set of one or more OFDM symbols.

10. The method of claim 9, wherein the first control channel and the second control channel contain ACK/NACK information for one or more user equipment devices.

11. The method of claim 9, further comprising:
mapping each of a sequence of Physical Hybrid Automatic Repeat Request Indicator Channels (PHICHs) to a corresponding group of exactly three sets of space-frequency block codes, wherein even PHICHs of the sequence are mapped using the first spatial alternation assignment, wherein odd PHICHs of the sequence are mapped using the second spatial alternation assignment, wherein the sequence of PHICHs includes more than two PHICHs.

12. The method of claim 11,
wherein a transmission bandwidth of the one or more OFDM symbols includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences,
wherein, for each of the PHICHs, the first and last sets of space-frequency block codes of the corresponding group map onto a different OFDM symbol than the middle set.

13. The method of claim 11,
wherein the set of one or more OFDM symbols comprises at least three OFDM symbols, wherein each of the PHICHs maps onto a set of three frequency resources,
wherein, for each of the PHICHs, the first, middle and last sets of space-frequency block codes of the corresponding group map onto distinct OFDM symbols.

14. The method of claim 11,
wherein the set of one or more OFDM symbols consists of only a first OFDM symbol,
wherein a transmission bandwidth of the first OFDM symbol includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences and are interleaved in frequency in an alternating manner,
wherein each of the odd PHICHs is mapped to a corresponding set of three frequency resources from the first subsequence, wherein, for each of the odd PHICHs, each one of the exactly three sets of space-frequency block codes of the corresponding group is mapped to a different one of the frequency resources of the corresponding set of three frequency resources;

wherein each of the even PHICHs is mapped to a corresponding set of three frequency resources from the second subsequence, wherein, for each of the even PHICHs, each one of the exactly three sets of space-frequency block codes of the corresponding group is mapped to a different one of the frequency resources of the corresponding set of three frequency resources.

15. A non-transitory memory medium for operating a communication device, wherein the memory medium stores program instructions, wherein the program instructions, when executed by a baseband processor, cause the communication device to implement:

mapping a first vector of modulation symbols onto a first group of exactly three sets of space-frequency block codes according to a first spatial alternation assignment, wherein each set of space-frequency block codes of the first group includes two or more space-frequency block codes arranged in frequency, wherein the first vector of modulation symbols corresponds to a first control channel, wherein said mapping the first vector according to the first spatial alternation assignment includes mapping a first and last of the exactly three sets of the first group to a first pair of antennas, and a middle one of the exactly three sets of the first group to a second pair of antennas;

mapping a second vector of modulation symbols onto a second group of exactly three sets of space-frequency block codes according to a second spatial alternation assignment, wherein each set of space-frequency block codes of the second group includes two or more space-frequency block codes arranged in frequency, wherein the second vector of modulation symbols corresponds to a second control channel, wherein said mapping the second vector according to the second spatial alternation assignment includes mapping a first and last of the exactly three sets of the second group to the second pair of antennas, and a middle one of the exactly three sets of the second group to the first pair of antennas; and transmitting the first group and the second group over a set of one or more OFDM symbols.

16. The memory medium of claim 15, wherein the first control channel and the second control channel contain ACK/NACK information for one or more user equipment devices.

17. The memory medium of claim 15, wherein the program instructions, when executed by the baseband processor, further cause the communication device to implement:

mapping each of a sequence of Physical Hybrid Automatic Repeat Request Indicator Channels (PHICHs) to a corresponding group of exactly three sets of space-frequency block codes, wherein even PHICHs of the sequence are mapped using the first spatial alternation assignment, wherein odd PHICHs of the sequence are mapped using the second spatial alternation assignment, wherein the sequence of PHICHs includes more than two PHICHs.

18. The memory medium of claim 17,
wherein a transmission bandwidth of the one or more OFDM symbols includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences, wherein, for each of the PHICHs, the first and last sets of space-frequency block codes of the corresponding group map onto a different OFDM symbol than the middle set.

19. The memory medium of claim 17,
wherein the set of one or more OFDM symbols comprises at least three OFDM symbols, wherein each of the PHICHs maps onto a set of three frequency resources, wherein, for each of the PHICHs, the first, middle and last sets of space-frequency block codes of the corresponding group map onto distinct OFDM symbols.

20. The memory medium of claim 17,
wherein the set of one or more OFDM symbols consists of only a first OFDM symbol,
wherein a transmission bandwidth of the first OFDM symbol includes a sequence of frequency resources for transmission of the PHICHs, wherein the sequence of frequency resources includes a first subsequence of frequency resources for the odd PHICHs and a second subsequence of frequency resources for the even PHICHs, wherein the first subsequence and second subsequence are disjoint subsequences and are interleaved in frequency in an alternating manner, wherein each of the odd PHICHs is mapped to a corresponding set of three frequency resources from the first subsequence, wherein, for each of the odd PHICHs, each one of the exactly three sets of space-frequency block codes of the corresponding group is mapped to a different one of the frequency resources of the corresponding set of three frequency resources;

wherein each of the even PHICHs is mapped to a corresponding set of three frequency resources from the second subsequence, wherein, for each of the even PHICHs, each one of the exactly three sets of space-frequency block codes of the corresponding group is mapped to a different one of the frequency resources of the corresponding set of three frequency resources.

21. A user equipment (UE) device comprising:
a baseband processor; and
memory storing program instructions, wherein the program instructions, when executed by the baseband processor, cause the baseband processor to:
receive baseband signals from a transmitter that includes a first pair of antennas and a second pair of antennas, wherein the transmitter is configured to:
(a) map a first vector of modulation symbols onto a first group of exactly three sets of space-frequency block codes according to a first spatial alternation assignment, wherein each set of space-frequency block codes of the first group includes two or more space-frequency block codes arranged in frequency, wherein the first vector of modulation symbols corresponds to a first control channel, wherein said mapping the first vector according to the first spatial alternation assignment includes mapping a first and last of the exactly three sets of the first group to the first pair of antennas, and a middle one of the exactly three sets of the first group to the second pair of antennas;
(b) map a second vector of modulation symbols onto a second group of exactly three sets of space-frequency block codes according to a second spatial alternation assignment, wherein each set of space-frequency block codes of the second group includes two or more space-frequency block codes arranged in frequency, wherein the second vector of modulation symbols corresponds to a second control channel, wherein said mapping the second vector according to the second spatial alternation assignment includes mapping a first and last of the exactly three sets of the second group to the second pair of antennas, and a middle one of the exactly three sets of the second group to the first pair of antennas; and (c) transmit the first group and the second group over a set of one or more OFDM symbols, wherein the baseband signals are received in response to said transmission of the first group and the second group over the set of one of more OFDM symbols;

decode the baseband signals to recover information from at least one of the first control channel and the second control channel.

22. The UE device of claim 21, wherein the first control channel and/or the second control channel contain ACK/NACK information for the UE device.

23. The UE device of claim 21, wherein each space-frequency block code of each set of the first group is an Alamouti code.

24. The UE device of claim 21, wherein the transmitter is part of a base station.

25. An apparatus comprising:

a processor; and memory storing program instructions, wherein the program instructions, when executed by the processor, cause the processor to:

receive baseband signals from a transmitter that includes a first pair of antennas and a second pair of antennas, wherein the transmitter is configured to:

(a) map a first vector of modulation symbols onto a first group of exactly three sets of space-frequency block codes according to a first spatial alternation assignment, wherein each set of space-frequency block codes of the first group includes two or more space-frequency block codes arranged in frequency, wherein the first vector of modulation symbols corresponds to a first control channel, wherein said mapping the first vector according to the first spatial alternation assignment includes mapping a first and last of the exactly three sets of the first group to the first pair of antennas, and a middle one of the exactly three sets of the first group to the second pair of antennas;

(b) map a second vector of modulation symbols onto a second group of exactly three sets of space-frequency block codes according to a second spatial alternation assignment, wherein each set of space-frequency block codes of the second group includes two or more space-frequency block codes arranged in frequency, wherein the second vector of modulation symbols corresponds to a second control channel, wherein said mapping the second vector according to the second spatial alternation assignment includes mapping a first and last of the exactly three sets of the second group to the second pair of antennas, and a middle one of the exactly three sets of the second group to the first pair of antennas; and (c) transmit the first group and the second group over a set of one or more OFDM symbols, wherein the baseband signals are received in response to said transmission of the first group and the second group over the set of one of more OFDM symbols;

decode the baseband signals to recover information from at least one of the first control channel and the second control channel.

26. The apparatus of claim 25, wherein the transmitter is further configured to map each of a sequence of Physical Hybrid Automatic Repeat Request Indicator Channels (PHICHs) to a corresponding group of exactly three sets of space-frequency block codes, wherein even PHICHs of the sequence are mapped using the first spatial alternation assignment, wherein odd PHICHs of the sequence are mapped using the second spatial alternation assignment, wherein the sequence of PHICHs includes more than two PHICHs.

* * * * *